Aug. 26, 1969       E. H. CAPLAN       3,463,307
DISPLAY PACKAGE
Filed Oct. 6, 1967
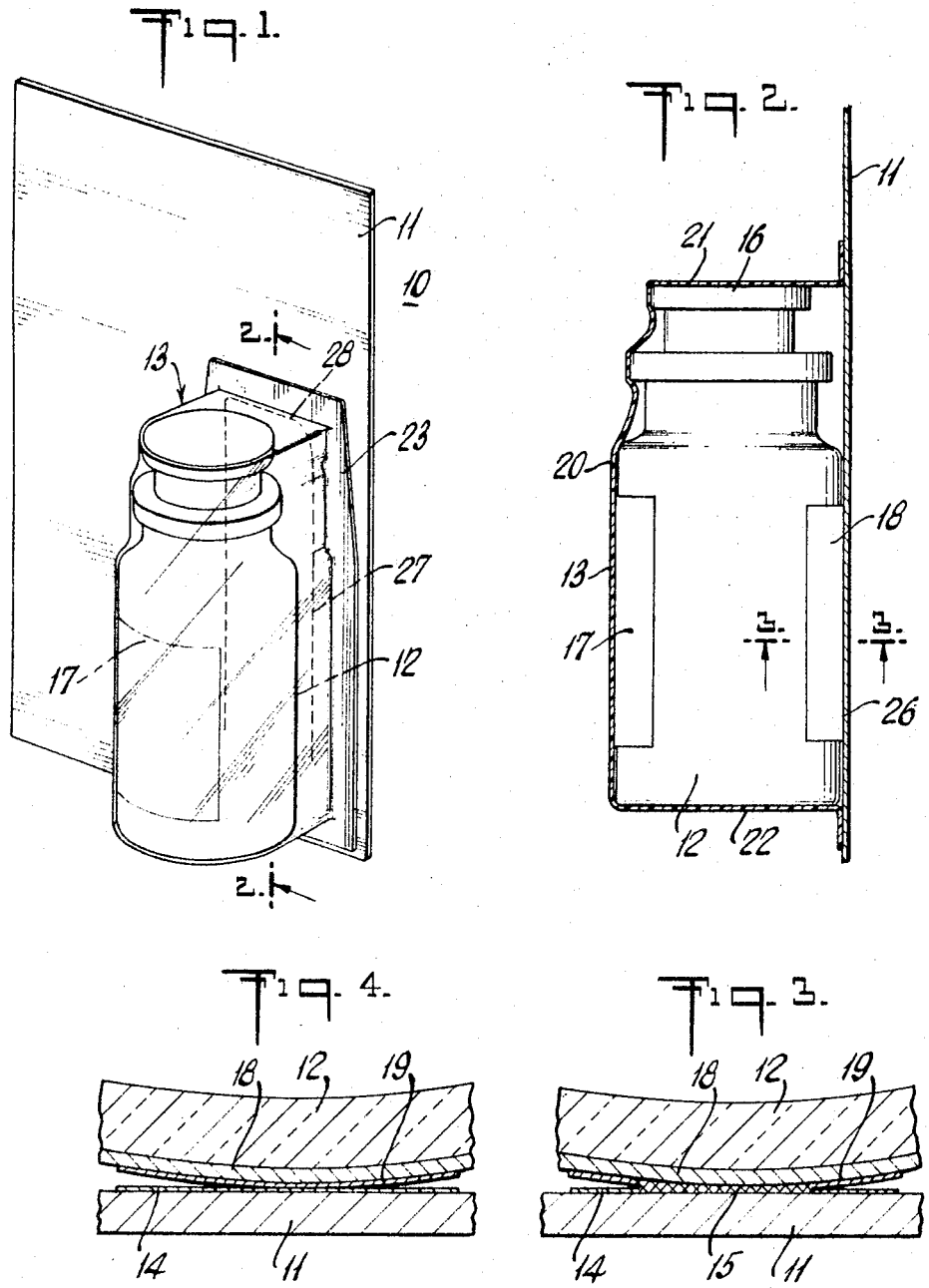
INVENTOR
EARL H. CAPLAN
BY
William P. Lieberman
ATTORNEY United States Patent Office 3,463,307
Patented Aug. 26, 1969

3,463,307
DISPLAY PACKAGE
Earl H. Caplan, Bayside, N.Y., assignor to Nysco Laboratories, Inc., Long Island City, N.Y., a corporation of New York
Filed Oct. 6, 1967, Ser. No. 673,452
Int. Cl. B65d 73/00, 5/52
U.S. Cl. 206—78
5 Claims

ABSTRACT OF THE DISCLOSURE

A tamperproof display package includes a backing sheet having a section which is coated with a thermoplastic resin, and a bottle having a front label and a panel attached to its rear face and coated with said thermoplastic resin, the bottle being secured to the backing sheet by the heat fusion of the thermoplastic resin coatings. The bottle is enclosed in a transparent plastic shell secured to the backing sheet.

BACKGROUND OF THE INVENTION

The present invention relates generally to improvements in display packages and it relates particularly to an improved blister enclosed display package.

Pharmaceutical and food supplement products such as aspirin, antihistamines, vitamin preparations and the like are conventionally administered as pills, capsules and similar dosage forms and these in turn are generally packaged in sealed bottles provided with labels identifying and describing the packaged products and their recommended use. Products of various types are now marketed in blister packages, that is, packages wherein the product is enclosed in a transparent open backed shell which is secured along its peripheral border to a larger backing sheet. The blister packaging of products affords many advantages in that it is inexpensive, attractive, expedites the display and distribution of the product, and is highly versatile. However, when employed in the packaging of labelled bottled products such as pharmaceuticals and food supplements it possesses many drawbacks, particularly when employed with bottles of cylindrical shape. In the blister packaging of cylindrical bottles, the bottle is generally free to rotate and as a consequence the front of the bottle which bears a label is frequently located at the rear or side of the blister enclosure thereby resulting in an unattractive package in which much of the desired information is unavailable.

SUMMARY OF THE INVENTION

A principal object of the present invention is to provide an improved package.

Another object of the present invention is to provide an improved package of the type in which the product is blister enclosed.

Still another object of the present invention is to provide an improved package highly suitable for the display and distribution of bottle products such as pharmaceuticals, food supplements, cosmetics, and the like.

A further object of the present invention is to provide a package of the above nature characterized by its simplicity, low cost, attractive appearance, versatility and adaptability.

The above and other objects of the present invention will become apparent from a reading of the following description taken in conjunction with the accompanying drawing which illustrates a preferred embodiment thereof.

In a sense, the present invention contemplates the provision of a display package comprising a backing sheet, a product containing receptacle having a rear face separably secured to said backing sheet and bearing information on its front face, and an open backed transparent thermoplastic polymeric resin shell enclosing said receptacle and having a peripheral border secured to said backing sheet. Advantageously, the receptacle comprises a stoppered cylindrical bottle having an information bearing label on its front face and a thermoplastic resin coated label on its rear face. The backing sheet is provided on its front face with a thermoplastic resin coating which is integrally fused with the bottle rear label thermoplastic resin coating along a longitudinally extending area. The shell is provided with an outwardly directed coplanar peripheral flange which is adherent to the backing sheet front face, and the backing sheet within the peripheral area of the shell has a flap delineating line of weakness formed therein.

The display package of the present invention provides the advantages of blister and bottle packaging without any of the drawbacks thereof. The bottle is fixed in a predetermined position within the blister to present a uniform attractive appearance, and although the product carrying receptacle is easily and readily accessible it is only accessible by the opening of the blister or backing sheet which modifies the package in a manner which is thereafter always visually evident.

BRIEF DESCRIPTION OF THE DRAWING

FIGURE 1 is a front perspective view of a display package embodying the present invention;

FIGURE 2 is a sectional view taken along line 2—2 in FIGURE 1;

FIGURE 3 is an enlarged sectional view taken along line 3—3 in FIGURE 2; and

FIGURE 4 is a view similar to FIGURE 3 illustrating the relationship of the product containing bottle and the backing sheet during the assembly thereof.

DESCRIPTION OF THE PREFERRED EMBODIMENT

Referring now to the drawing which illustrates a preferred embodiment of the present invention, the reference numeral 10 generally designates the improved display package which comprises a backing or base sheet 11, a product receptacle 12 and a housing blister or shell 13.

The backing sheet 11 is formed of a relatively stiff cardboard or other suitable material and while illustrated as of rectangular configuration may be of any desired shape. The front face of the backing sheet 11, as well as the rear face thereof, if desired, carries any desired illustrations, decorations, and information, which may include a description of the product and its use, trademarks, and other data which may be printed or otherwise applied thereto. In addition, the front face of the backing sheet 11 or at least that part thereof in the area of the receptacle 12 is coated with a thin adherent layer 14 of any suitable heat sealing thermoplastic resin of known composition, for example, a polyolefin, saran, polystyrene, polyvinylchloride or the like.

The receptacle 12 comprises a wide mouthed cylindrical bottle, preferably formed of glass or a transparent thermoplastic polymeric resin, and is provided with a removable closure stopper 16 which may likewise be formed of glass or a thermoplastic polymeric resin such as polyethylene or the like. Cemented or glued to the front face of the bottle 12 is an information bearing label 17 formed of paper or the like, it being noted that the desired information may be applied in any known manner directly to the face of the bottle instead of by way of the label 17.

A label 18 is cemented or otherwise glued to the rear face of the bottle 12 and may or may not carry information and representations, as desired. The outer face of the label 18 is coated at least in an area diametrically opposite the vertical medial section of the label 17 with a layer 19 of a thermoplastic polymeric resin compatible and fusible with and preferably the same as that forming the layer 14. It should be noted that the layer 19 may be adherently applied directly to the rear face of the bottle 12 in any known manner. In mounting the bottle 12 to the backing sheet 11 it is merely placed against the backing sheet with the thermoplastic layers 14 and 19 in engagement under pressure and the area of contact of the plastic layers 14 and 19 is heated to effect the fusion of the layers 14 and 19 in the area of contact into a narrow thin substantial integral mass 15. The heating of the contact area of the layers 14 and 19 may be achieved in any suitable manner such as by applying a heated member to the rear face of the backing sheet 11 proximate the area of contact of the plastic layers 14 and 19 for a time and at a temperature sufficient to effect said fusion without burning the sheet 11.

The stoppered bottle 12 is enclosed by a conventionally produced open backed blister or shell 13 having a front peripheral wall 20 substantially mating the corresponding raised areas of the stoppered bottle 12 and parallel horizontal top and bottom walls 21 and 22 respectively which substantially engage the top of the stopper 16 and the bottom of the bottle 12 and thereby assist in preventing the opening of the bottle 12. The shell 13 is open at its rear sufficiently to permit the nesting of the bottle therein and is provided at said opening with an outwardly directed peripheral coplanar flange 23. The shell 13 with its rear opening closed by a section of the backing sheet 11 fully encloses the bottle 12 whose rear face is secured to the backing sheet 14 and whose front face is engaged by the shell 13. The shell 13 is secured to the backing sheet by adhering the peripheral flange 23 thereto in any suitable manner.

A normally closed and sealed flap 26 is formed in the backing sheet 11 in the area of the rear opening in the shell 13. The flap 26 is delineated by scored lines or lines of weakness 27 formed in the backing sheet 11 along and shortly inwardly of the side and bottom edges of the rear opening of the shell 13, the upper ends of the score line 27 being connected by a transverse fold line 28 positioned directly below the upper edge of the shell opening.

Considering now the operation of the display package 10, the filled and stoppered bottle 12 is secured to the backing sheet 11 with the label 17 forwardly directed, and the shell 13 applied thereto in the manner described above. Access to the packaged product may be had by either opening the flap 26 by breaking the score lines 27 and folding the flap rearwardly along the fold line 28 to carry the bottle 12 therewith which may be then detached from the flap 26 or by breaking or separating the shell 13 from the backing sheet 11 and separating the bottle 12 from the backing sheet 11. In any event, the blister package closure is destroyed attendant to the provision of access to the contents of the bottle 12.

While there has been described and illustrated a preferred embodiment of the present invention, it is apparent that numerous alterations, omissions and additions may be made without departing from the spirit thereof.

I claim:

1. A display package comprising a backing sheet provided on its front face with a thermoplastic resin layer, a product containing bottle having a thermoplastic resin layer on its rear face integrally fused along a predetermined area with said resin layer on said backing sheet and bearing information on its front face, and an open backed transparent thermoplastic polymeric resin shell enclosing said bottle and having a peripheral border secured to said backing sheet.

2. The display package of claim 1, wherein said shell is provided with an outwardly directed coplanar peripheral flange adherent to the front face of said backing sheet.

3. The display package of claim 1, wherein said bottle has a label on its front face bearing said information and a panel adherent on its rear face coated with said resin layer fused with said backing sheet thermoplastic resin coating, said shell being provided with an outwardly directed coplanar peripheral flange adherent to the front face of said backing sheet.

4. The display package of claim 1, wherein said backing sheet has lines of weakness formed therein and extending inwardly of and along the inner periphery of said shell and delineating a flap member supporting said bottle.

5. The display package of claim 1, wherein said shell includes top and bottom walls engaging the top and bottom of said receptacle whereby to prevent the opening of said receptacle.

References Cited

UNITED STATES PATENTS

| | | | |
|---|---|---|---|
| 2,293,072 | 8/1942 | Morrill | 206—81 |
| 2,672,258 | 3/1954 | Marberg | 206—80 |
| 2,876,899 | 3/1959 | Maynard | 206—80 |
| 3,004,661 | 10/1961 | Schumann | 206—78 |
| 3,151,741 | 10/1964 | Haecker | 206—78 |
| 3,204,759 | 9/1965 | Palmer | 206—45.31 |
| 3,209,906 | 10/1965 | Kraut | 206—80 |
| 3,327,846 | 6/1967 | Offray | 206—80 |

WILLIAM T. DIXSON, JR., Primary Examiner

U.S. Cl. X.R.

206—45.14